(12) United States Patent
Kim et al.

(10) Patent No.: US 9,201,227 B2
(45) Date of Patent: Dec. 1, 2015

(54) OPTICAL SYSTEM AND IMAGE PROJECTING APPARATUS USING THE SAME

(75) Inventors: Sung-tae Kim, Seoul (KR); Jeong-ho Nho, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 789 days.

(21) Appl. No.: 13/096,304

(22) Filed: Apr. 28, 2011

(65) Prior Publication Data

US 2011/0267687 A1    Nov. 3, 2011

(30) Foreign Application Priority Data

Apr. 29, 2010   (KR) .................. 10-2010-0040069

(51) Int. Cl.
  *G02B 17/00*    (2006.01)
  *G02B 17/08*    (2006.01)

(52) U.S. Cl.
  CPC ............ *G02B 17/0852* (2013.01); *G02B 17/08* (2013.01); *G02B 17/0896* (2013.01)

(58) Field of Classification Search
  CPC ........ G02B 15/00; G02B 15/14; G02B 15/15; G02B 15/161; G02B 15/22; G02B 17/00; G02B 17/06; G02B 17/0694; G02B 17/08; G02B 17/0852; G02B 17/0896
  USPC ................. 359/362–366, 649–651, 726–732, 359/850–861
  See application file for complete search history.

(56) References Cited

U.S. PATENT DOCUMENTS

| | | | |
|---|---|---|---|
| 4,971,428 A | 11/1990 | Moskovich | |
| 5,383,052 A * | 1/1995 | Okazaki et al. | 359/364 |
| 5,477,394 A * | 12/1995 | Shibazaki | 359/858 |
| 5,847,874 A * | 12/1998 | Sasao et al. | 359/554 |
| 6,118,474 A | 9/2000 | Nayar | |
| 6,144,503 A * | 11/2000 | Sugano | 359/749 |
| 7,095,566 B2 * | 8/2006 | Suzuki et al. | 359/696 |
| 7,274,522 B2 * | 9/2007 | Inamoto | 359/834 |
| 2001/0024570 A1 | 9/2001 | Weigel et al. | |
| 2006/0066760 A1 * | 3/2006 | Cho et al. | 348/744 |
| 2008/0068563 A1 * | 3/2008 | Abe et al. | 353/98 |
| 2008/0180789 A1 * | 7/2008 | Reichert | 359/356 |

FOREIGN PATENT DOCUMENTS

JP     2008-90200 A       4/2008
WO   2008/069253 A1     6/2008

OTHER PUBLICATIONS

Communication dated Jul. 20, 2011, issued in corresponding European Patent Application No. 11164121.3.

* cited by examiner

*Primary Examiner* — Thong Nguyen
(74) *Attorney, Agent, or Firm* — Sughrue Mion, PLLC

(57) ABSTRACT

The optical system includes: a first optical group which performs a zoom function using a first movable lens, a second optical group which performs a focus function using a second movable lens, and a third optical group which performs a wide angle function by reflecting light passing through the first optical group and the second optical group, wherein a first intermediate image is formed between the first optical group and the second optical group.

12 Claims, 6 Drawing Sheets

OPTICAL SYSTEM AND IMAGE PROJECTING APPARATUS USING THE SAME

CROSS-REFERENCE TO RELATED APPLICATION

This application claims priority from Korean Patent Application No. 10-2010-0040069, filed on Apr. 29, 2010, in the Korean Intellectual Property Office, the disclosure of which is incorporated herein by reference in its entirety.

BACKGROUND

1. Field

Methods and apparatuses consistent with exemplary embodiments relate to an optical system and an image projecting apparatus using the same, and more particularly, to an optical system which is adapted to project light onto a big screen in a small projecting space, and an image projecting apparatus using the same.

2. Description of the Related Art

With the development of the information industry, devices to meet the growing demand for big screens, such as an image projecting apparatus using a light source, have become popular.

In general, an image projecting apparatus includes a screen and a projector to enlarge and project an image onto the screen. Particularly, in order to form a projected image on the screen, the image projecting apparatus is required to have a constant projection distance.

As the projection distance becomes longer, the image generated at the projector is more likely to be blocked by an obstacle or a user midway between the projector and the screen, and there is a problem that light projected from the projector enters users' eyes.

In order to solve these problems, short distance projectors and ultra short projectors, having short projection distances, have recently been developed. The short distance projector has a projection distance of about 60-70 cm between the projector and the screen, and the ultra short projector has a projection distance of about 30-50 cm.

However, as the projection distance becomes shorter, there is a problem that additional functions, such as a zoom function, are not supported due to the size and the projection distance of the projector.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an optical system which includes an optical group for performing a zoom function using at least one movable lens, and an image projecting apparatus using the same.

According to an aspect of an exemplary embodiment, there is provided an optical system, including: a first optical group which performs a zooming, the first optical group including a first movable lens, a second optical group which performs a focusing, the second optical group including a second movable lens, and a third optical group which performs a wide angle function by reflecting light passing through the first optical group and the second optical group. A first intermediate image may be formed between the first optical group and the second optical group.

The first optical group, the second optical group, and the third optical group may be arranged in sequence.

A second intermediate image may be formed between the second optical group and the third optical group.

The third optical group may include a concave mirror having an aspheric surface.

The first lens and the second lens may be linearly movable with reference to an optical axis.

The first lens may be configured to change a focal distance from a wide angle end to a telephoto end when moved in a direction closer to the third optical group.

The third optical group may compensate for a distortion aberration.

The first intermediate image may include a surface consisting of focal points between the first optical group and the second optical group, and the second intermediate image may include a surface consisting of focal points between the second optical group and the third optical group.

According to an aspect of another exemplary embodiment, there is provided an image projecting apparatus including the above-described optical system.

Additional aspects and advantages of the exemplary embodiments will be set forth in the detailed description. Additional aspects and advantages of exemplary embodiments will be obvious from the detailed description, or may be learned by practicing the exemplary embodiments.

BRIEF DESCRIPTION OF THE DRAWING FIGURES

The above and/or other aspects will be more apparent and more readily appreciated from the following description of exemplary embodiments, taken in conjunction with the accompanying drawings, in which.

DETAILED DESCRIPTION OF THE EXEMPLARY EMBODIMENTS

Figure 1:
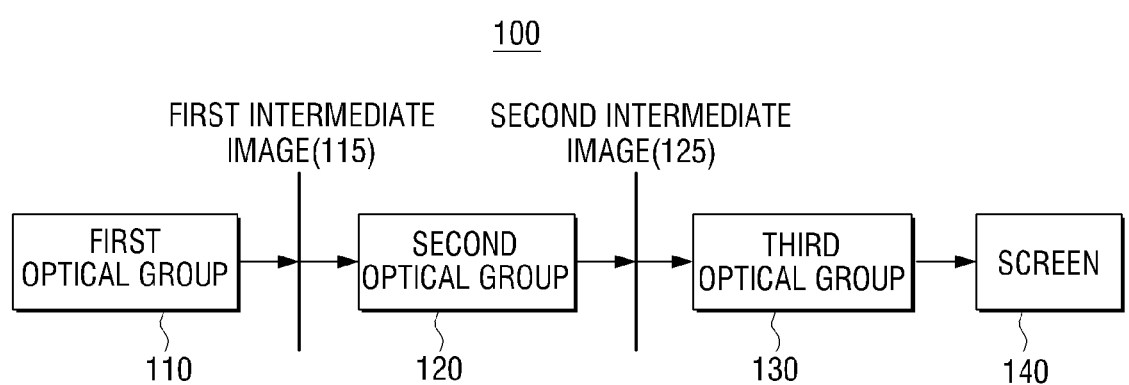
FIG. 1 is a schematic view illustrating an optical system according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art such as an actuator or a body are not described in detail since they would obscure the exemplary embodiments with unnecessary detail.

FIG. 1 is a schematic view illustrating an optical system 100 according to an exemplary embodiment. As shown in FIG. 1, the optical system 100 includes a first optical group 110, a second optical group 120, and a third optical group 130. This plurality of optical groups 110, 120, 130 is used in combination so that a focal distance of the optical system 100 can be changed from a wide angle end to a telephoto end.

In FIG. 1, a light source (not shown) is located in front of the first optical group 110 and a screen 140 on which an image of a subject is formed is located behind the third optical group 130. In other words, the first to the third optical groups 110 to 130 are located in sequence from the light source. A "light source direction" recited herein refers to a direction advancing toward the light source (a leftward direction in FIG. 1) and an 'upward direction" recited herein refers to a direction advancing toward the screen 140 (a rightward direction in FIG. 1).

The first optical group 110 includes a first movable lens. The first lens moves in the upward direction so that the optical system 100 changes from a wide angle end to a telephoto end. In other words, the first lens moves between the light source and the second optical group 120, so that the first optical group 110 performs a zoom function. Lenses other than the first lens may be fixed or movable.

Light passing through the first optical group 110 forms a first intermediate image 115 between the first optical group 110 and the second optical group 120. The first intermediate image 115 refers to a surface comprised of focal points of the light. Therefore, the first intermediate image 115 may be called a first focal surface.

The light passing through a position of the first intermediate image 115 enters the second optical group 120. The second optical group 120 performs a focusing function using a second movable lens. In other words, the second lens is moved according to the change in position of the first lens. The second lens is one lens in this embodiment, but this is merely an example. The second lens may be a plurality of lenses. Also, the second optical group 120 compensates for or controls various aberrations caused by incident light.

The light passing through the second lens forms a second intermediate image 125 between the second optical group 120 and the third optical group 130. The second intermediate image 125 may also be called a second focal surface because the second intermediate image 125 is a surface comprised of focal points of light.

The light passing through a position of the second intermediate image 125 is reflected by the third optical group 130 and is projected onto the screen 140. In this example, the third optical group 130 is embodied as a concave mirror. Accordingly, the third optical group 130 performs a wide angle function so that an image can be displayed even at a short projection distance. Also, since the third optical group 130 has an aspheric surface, the third optical group 130 compensates for a distortion aberration. The main parameters of the aspheric surface are calculated by the following equation:

$$X = \frac{\frac{h^2}{r}}{1 + \left[1 - (1+k)\frac{h^2}{r^2}\right]^{1/2}} + bh^4 + ch^6 + dh^8 + eh^{10} + fh^{12} \quad \text{[Equation 1]}$$

wherein 'X' is a distance from a vertex of a mirror in an optical axis direction, 'h' is a distance perpendicular to the optical axis, 'r' is a radius of curvature at the vertex of the optical axis, 'k' is a conic constant, and 'b', 'c', 'd', 'e', and 'f' are an aspheric coefficient.

As described above, since the first optical group 110 is included in the optical system 100, even a projector having a short projection distance is able to perform the zoom function owing to the above-described optical system 100.

Figure 2:
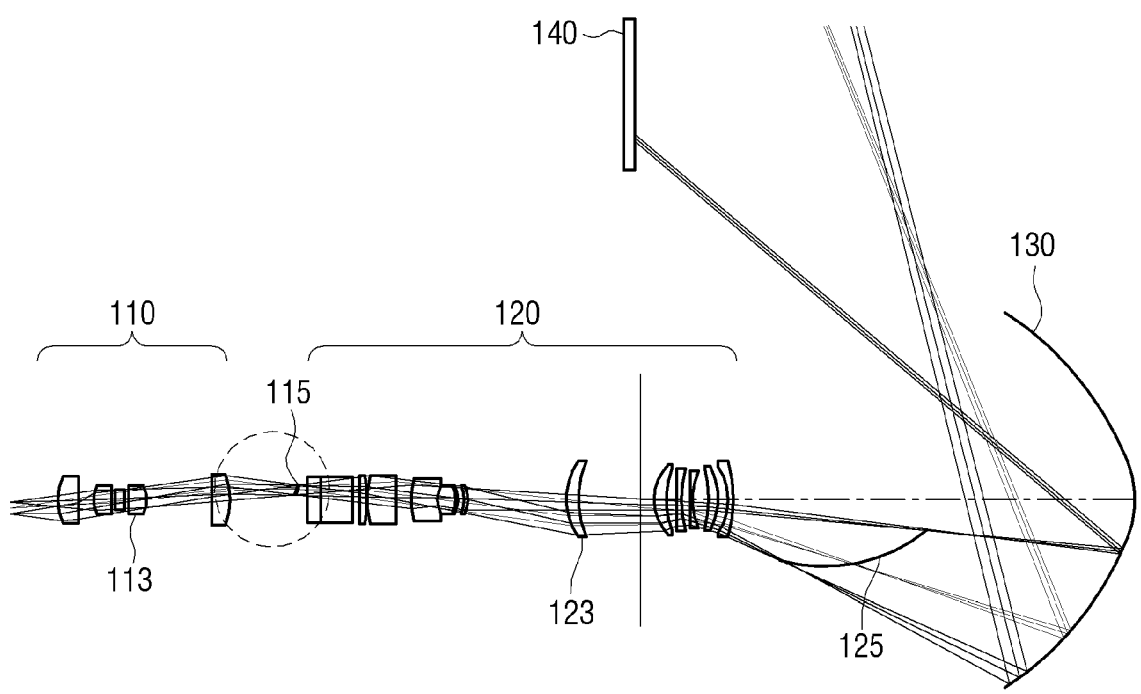
FIG. 2 is a cross-section view of the optical system at a wide angle end according to an exemplary embodiment.
Figure 3:
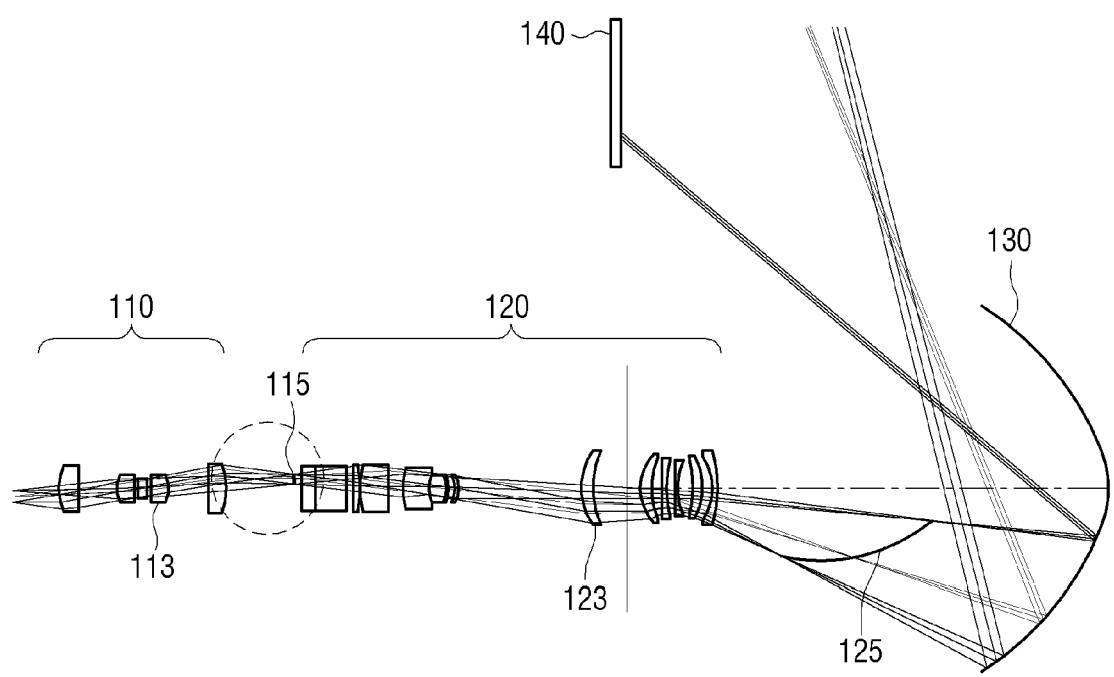
FIG. 3 is a cross-section view of the optical system at a middle position according to an exemplary embodiment.
Figure 4:
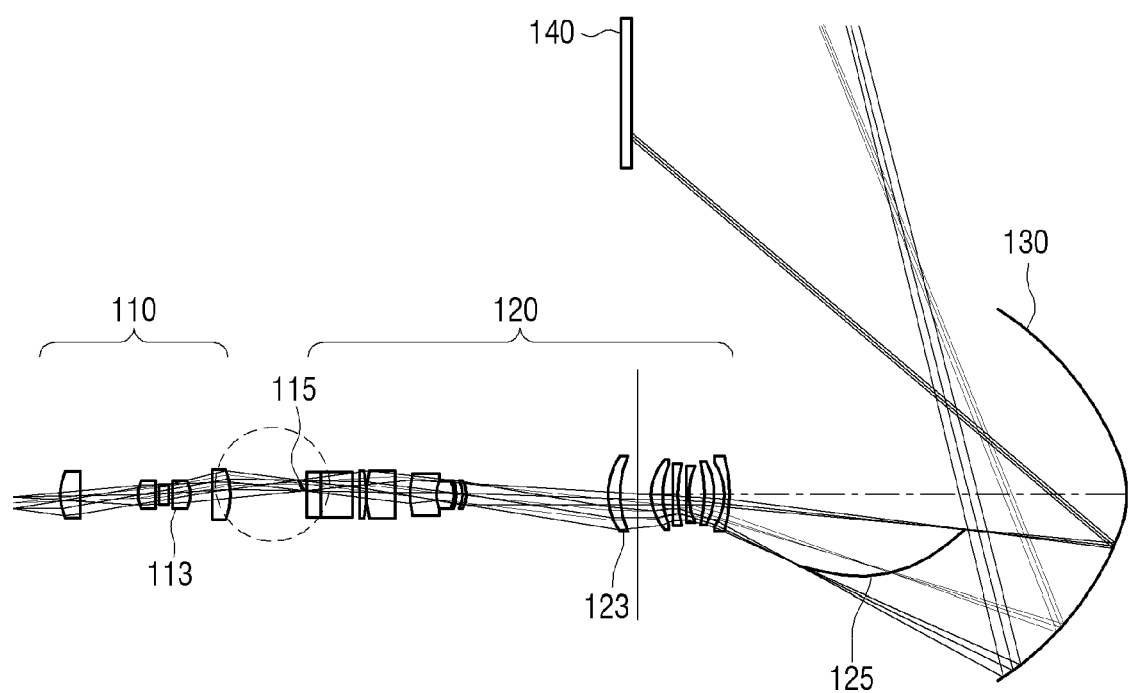
FIG. 4 is a cross-section view of the optical system at a telephoto end according to an exemplary embodiment.

Hereinafter, an operation of the optical system 100 will be explained with reference to FIGS. 2 to 5. FIG. 2 is a cross-section view of the optical system 100 at the wide angle end according to an exemplary embodiment. FIG. 3 is a cross-section view of the optical system 100 at the middle position according to an exemplary embodiment. FIG. 4 is a cross section view of the optical system 100 at the telephoto end according to an exemplary embodiment.

As shown in FIGS. 2 to 4, the optical system 100 includes the first optical group 110, the second optical group 120, and the third optical group 130. The first optical group 110 includes a first movable lens 113, and the second optical group 120 includes a second movable lens 123. As described above, a zoom function is performed by moving the first movable lens 113 of the first optical group 110. Also, a focus function is performed by moving the second movable lens 123 of the second optical group 120. Additionally, since the third optical group 130 is a concave mirror including an aspheric surface, the third optical group 130 performs a wide angle function and a distortion compensating function.

Figure 5:
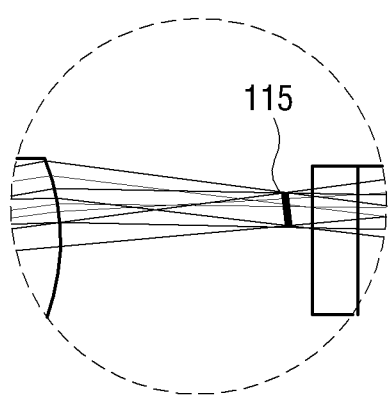
FIG. 5 is a view illustrating a first intermediate image according to an exemplary embodiment.

In particular, as shown in FIGS. 2 to 4, the optical system 100 forms a first intermediate image 115 between the first optical group 110 and the second optical group 120 and forms a second intermediate image 125 between the second optical group 120 and the third optical group 130. FIG. 5 is a view illustrating the first intermediate image 115 in detail according to an exemplary embodiment. As shown in FIG. 5, the first intermediate image 115 refers to a surface comprised of focal points formed between the first optical group 110 and the second optical group 120. According to an exemplary embodiment, the optical system 100 forms the two intermediate images 115, 125 so that a higher magnification zoom function can be performed.

Also, according to an exemplary embodiment, the optical system 100 may perform a zoom function by linearly moving the first lens 113 in the direction of the optical axis of the optical system. Specifically, the optical system 100 performs the zoom function by changing the focal distance from the wide angle end to the telephoto end, so that the first lens 113 is moved toward the second optical group 120 (or toward the screen 140). Since the focal distance changes from the wide angle end to the telephoto end, the positions of the first intermediate image 115 and the second intermediate image 125 are changed.

Figure 6:
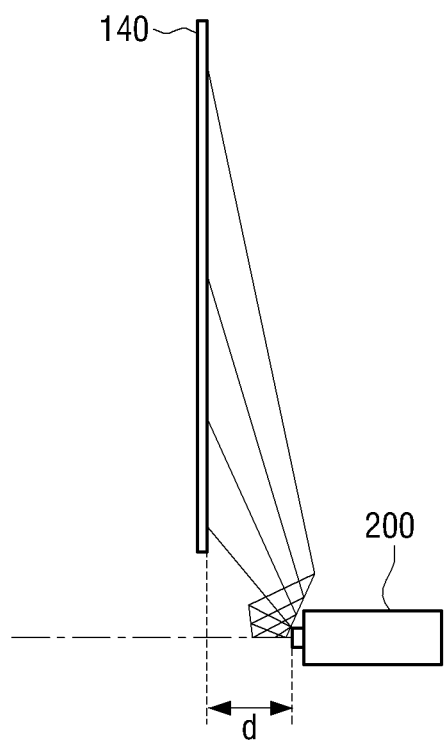
FIG. 6 is a view illustrating a projector according to an exemplary embodiment.

FIG. 6 is a view illustrating a projector 200 including the optical system 100 according to an exemplary embodiment.

As shown in FIG. 6, the projector 200 and the screen 140 are distanced from each other by a projection distance 'd'. According to an exemplary embodiment, the projector 200 is configured to project an image from a very short distance 'd' of less than about 50 cm, and, more specifically, about 30 cm to 50 cm. Also, the projector 200 includes the zoom function so that the projector 200 can adjust the size of an image projected onto the screen 140.

In the above embodiment, the first optical group 110 performing the zoom function is located closer to the light source than the second optical group 120 performing the focus function. However, this is merely an example. The second optical group 120 performing the focus function may be located closer to the light source than the first optical group 110 performing the zoom function.

Also, in the above embodiment, the first optical group 110 and the second optical group 120 are embodied by the lens combinations shown in FIGS. 2 to 4. However, this is merely an example. The zoom function and the focus function may be realized by other lens combinations, or other optical components.

Also, the image projecting apparatus is the projector 200 in the above embodiment. However, this is merely an example. The image projecting apparatus may be realized as a projection television or a projection monitor.

As described above, even a projector having a short projection distance is able to support the zoom function.

The foregoing exemplary embodiments and advantages are merely exemplary and are not to be construed as limiting the present inventive concept, the scope of which is defined in the appended claims. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An optical system comprising:
   a first optical group which performs a zoom function, the first optical group comprising a first movable lens;
   a second optical group which performs a focus function, the second optical group comprising a second movable lens; and
   a third optical group which performs a wide angle function by reflecting light passing through the first optical group and the second optical group, the third optical group comprising a concave mirror,
   wherein a first intermediate image is formed between the first optical group and the second optical group,
   wherein a second intermediate image is formed between the second optical group and the third optical group, and
   wherein the first movable lens, the second movable lens and the concave mirror are arranged in a straight line along an optical axis of the optical system and the first movable lens and the second movable lens move along the optical axis of the optical system.

2. The optical system as claimed in claim 1, wherein the first optical group, the second optical group, and the third optical group are arranged in sequence.

3. The optical system as claimed in claim 1, wherein the concave mirror has an aspheric surface.

4. The optical system as claimed in claim 1, wherein the first movable lens and the second movable lens move linearly with reference to an optical axis of the optical system.

5. The optical system as claimed in claim 4, wherein the first movable lens is configured to change a focal distance from a wide angle end to a telephoto end by moving in a direction closer to the third optical group.

6. The optical system as claimed in claim 1, wherein the third optical group compensates for a distortion aberration.

7. The optical system as claimed in claim 1, wherein the first intermediate image comprises a surface comprised of focal points between the first optical group and the second optical group, and
   wherein the second intermediate image comprises a surface comprised of focal points between the second optical group and the third optical group.

8. The optical system as claimed in claim 1, wherein the first intermediate image comprises a first focal surface, and
   wherein the second intermediate image comprises a second focal surface.

9. An image projecting apparatus comprising the optical system according to claim 1.

10. The image projecting apparatus of claim 9, further comprising,
    a screen;
    wherein a projection distance to the screen is less than about 50 cm.

11. The image projecting apparatus of claim 10, wherein the projection distance is less than about 50 cm.

12. The image projecting apparatus of claim 10, wherein the projection distance is about 30 cm to 50 cm.

* * * * *